(12) United States Patent
Villers et al.

(10) Patent No.: US 7,938,283 B2
(45) Date of Patent: May 10, 2011

(54) SYSTEM AND METHOD FOR HERMETIC STORAGE OF AGRICULTURAL COMMODITIES DURING SHIPPING

(75) Inventors: Philippe Villers, Concord, MA (US); Tom de Bruin, Kibbutz HaOgen (IL); Shlomo Navarro, Rishon Letsion (IL)

(73) Assignee: Grainpro, Inc., Concord, MA (US)

( * ) Notice: Subject to any disclaimer, the term of this patent is extended or adjusted under 35 U.S.C. 154(b) by 304 days.

(21) Appl. No.: 12/143,345

(22) Filed: Jun. 20, 2008

(65) Prior Publication Data

US 2010/0270297 A1    Oct. 28, 2010

(51) Int. Cl.
- B65D 88/00 (2006.01)
- B65D 30/10 (2006.01)
- B65D 33/02 (2006.01)
- B32B 27/08 (2006.01)

(52) U.S. Cl. ........ 220/1.5; 220/9.2; 220/9.4; 220/23.87; 220/23.89; 428/36.7

(58) Field of Classification Search .................... 220/1.5, 220/1.6, 9.2, 9.4, 23.86, 23.87, 23.89; 217/3 BC, 217/3 FC; 428/35.7, 36.6, 36.7
See application file for complete search history.

(56) References Cited

U.S. PATENT DOCUMENTS

| | | |
|---|---|---|
| 234,185 A | 11/1880 | Hendrick |
| 1,340,718 A | 5/1920 | Johnson |
| 2,624,886 A | 1/1953 | Herman |
| 2,730,150 A | 1/1956 | Wunderwald et al. |
| 2,914,776 A | 12/1959 | Hotz |
| 3,485,635 A | 12/1969 | Fassauer |
| 3,727,656 A | 4/1973 | Luders |
| 3,949,527 A | 4/1976 | Double et al. |
| 4,084,358 A | 4/1978 | Winters |
| 4,208,443 A | 6/1980 | Kanuch et al. |
| 4,224,770 A | 9/1980 | Petty |
| 4,413,029 A | 11/1983 | Handwerker |

(Continued)

FOREIGN PATENT DOCUMENTS

IL    87301    3/1996

(Continued)

OTHER PUBLICATIONS

Silage Density and Dry Matter Loss in Silo Bags by Mike Rankin, date unknown, http://www.uwex.edu/CES/croops/silobagdensity,htm.

(Continued)

Primary Examiner — Anthony Stashick
Assistant Examiner — Madison L Wright
(74) Attorney, Agent, or Firm — Weingarten, Schurgin, Gagnebin & Lebovici LLP

(57) ABSTRACT

Systems and methods for protected transportation of agricultural commodities are provided. The protected transportation is accomplished through the use of a thin, lightweight hermetic liner inside a shipping container. The liner is sealed at a first end and open at a second end, and the liner is positioned within the shipping container with the sealed first end at a back end of the shipping container and the second open end at a front, open end of the shipping container. A top portion of the liner is held to the ceiling of the shipping container via an attachment mechanism or via inflation of the liner and/or ribs in the liner. The bagged or bulk commodity is introduced through the open end and into the liner. The liner is then hermetically sealed, and the container is closed. After shipping, the agricultural commodity may be removed by unsealing the liner.

14 Claims, 10 Drawing Sheets

U.S. PATENT DOCUMENTS

| | | | |
|---|---|---|---|
| 4,508,737 | A | 4/1985 | Forest et al. |
| 4,521,372 | A | 6/1985 | Price et al. |
| 4,660,337 | A | 4/1987 | Ross et al. |
| 4,729,198 | A | 3/1988 | Nethery |
| 4,897,970 | A | 2/1990 | Double et al. |
| 5,170,599 | A | 12/1992 | Knight |
| 5,193,710 | A * | 3/1993 | Podd et al. ............ 220/1.6 |
| 5,288,266 | A | 2/1994 | Halley |
| 5,363,605 | A | 11/1994 | Handwerker |
| 6,132,088 | A * | 10/2000 | Suzuki ................ 383/23 |
| 6,186,713 | B1 | 2/2001 | Bonerb |
| 6,609,354 | B1 | 8/2003 | Villers et al. |
| 6,941,727 | B2 | 9/2005 | Villers et al. |
| 2003/0152671 | A1 | 8/2003 | Johnstone |
| 2005/0023278 | A1 * | 2/2005 | Yong ................ 220/1.6 |
| 2005/0208157 | A1 | 9/2005 | Villers et al. |
| 2006/0198861 | A1 | 9/2006 | Villers et al. |
| 2008/0202213 | A1 | 8/2008 | Villers et al. |
| 2008/0299272 | A1 | 12/2008 | Villers et al. |

FOREIGN PATENT DOCUMENTS

| | | |
|---|---|---|
| WO | WO-99/28578 | 6/1999 |
| WO | WO-99/45787 | 9/1999 |

OTHER PUBLICATIONS

Speech delivered on Jun. 7, 2007 by Sophie Mirabella to the Australian Wheat Board, http://www.silobag.com.au/home/.

Villers, et al., "Development and Applications of the Hermetic Storage Technology," Proceedings of the $9^{th}$ International Working Conference on Stored Product Protection, Oct. 15-18, 2006, Campinas, São Paulo, Brazil. Brazilian Post-harvest Association—ABRAPOS, Passo Fundo, RS, Brazil, 2006, pp. 719-729 (ISBN 8560234004).

"GrainPro SuperGrainbags", Jul. 2004, GrainPro, Inc., Concord, MA, www.grainpro.com.

* cited by examiner

SYSTEM AND METHOD FOR HERMETIC STORAGE OF AGRICULTURAL COMMODITIES DURING SHIPPING

FIELD OF THE INVENTION

The present invention relates to protected storage of agricultural commodities and, more particularly to systems and methods for hermetically storing agricultural commodities during shipping in shipping containers.

BACKGROUND OF THE INVENTION

Shipping containers are used to ship bulk or bagged agricultural commodities. However, four main problems remain unsolved: a) effects of oxidation including generation of free fatty acids (FFAs) where applicable; b) insect infestation and infestation development which can adversely effect quality preservation, c) growth of molds and resulting toxins, and d) raising of moisture content or condensation during transshipment. Insect infestation that disqualifies the product quality is a common problem to all packed commodities in polypropylene or jute woven bags, plastic or paper packages. These packaging materials cannot protect the commodities from damage due to "penetrators," which are insects that can bore holes through packaging materials; and "invaders," which are insects that enter packages through existing holes, such as folds and seams and air vents. Stored product insects are mainly of tropical and sub-tropical origin, and have spread to temperate areas via international trade. Therefore, it is important to protect the commodities from insect infestation. One method of providing an environmentally sound method of insect control is through hermetic storage.

In order to provide hermetic storage within a shipping container, it is necessary to provide a gastight structure to be placed within the container, and to develop suitable means of holding the gastight structure in place during loading, keeping it open during loading, and hermetically sealing it simply and efficiently. One problem that occurs during shipment is when moisture translocates from the commodity to the upper layers of the stack inside the containers. This moisture migration is caused due to differences in temperature, i.e., gradients, between the metal surfaces of the containers that absorb energy when exposed to solar irradiation and the container headspace with significantly lower temperatures at cooler times of the day. During heat absorption, the headspace of the container adjusts with the equilibrium air relative humidity of the commodity. During the cooler periods of the day, the air moisture at the headspace of the container condenses over the commodity and thereby increases the moisture content of the commodity. This excessive moisture causes mold damage that leads to the production of mycotoxins. In addition, increase in moisture content from outside humidity causes increase in fatty acids, and changes in color, taste and aroma of the commodities that disqualify the products.

The prevention of both condensation and increases in moisture content are important aspects of commodity transportation in containers. One known method of prevention is to provide a modified atmosphere for the agricultural commodity itself and any insects inside the commodity through their respiration. In addition, when useful, the generation of a modified atmosphere may be accelerated by injection of an inert gas. Although use of hermetic storage to preserve agricultural commodities in fixed locations is described in Israeli Patent number 87301, U.S. Pat. No. 6,609,354 and in U.S. Pat. No. 6,941,727 and U.S. patent application Ser. No. 11/970,173, entitled "Ultra-low permeability Lightweight Bunker Storage System and Method," and in transportable form as described in U.S. patent application Ser. No. 11/368,803, entitled "Flexible Ultra-low Permeability Transport System and Method," the need to provide a practical hermetic storage for an entire load during transport in conventional shipping containers is unmet.

What is needed is a system and method for protected transportation of agricultural commodities to preserve quality and prevent increases in moisture content of the commodity or moisture damage including condensation that may occur during shipping in containers.

SUMMARY OF THE INVENTION

There is provided, in accordance with embodiments of the present invention, a system to protect agricultural commodities during shipping of bulk or bagged commodities in shipping containers. The system includes a shipping container having a container front end and a container back end, a ceiling, a floor, walls connecting the ceiling to the floor, a container opening at the front end, and a door for closing the container opening, a thin, lightweight liner weighing between 75 and 187 gm/m2, wherein the liner includes a multi-layer material having a thickness in a range of 0.08-0.2 mm, having an outer layer; an inner layer; and a middle layer, the middle layer including at least one ultra-low permeability material. The thin lightweight liner has a bottom portion, a top portion, a pre-sealed back end positioned at the container back end, the pre-sealed back end sealing the bottom portion to the top portion, and an open end positioned at the container opening, wherein the top portion is configured to be held to the ceiling of the shipping container, and a fastener for hermetically sealing the open end of the thin, lightweight liner.

The liner may have a permeability to oxygen at 25° C. of 3 to 55 cc/m2/day. The shipping container may be a standard 20- or 40-foot shipping container. The multi-layer material may be a co-extruded material, and may be, for example, PE/nylon/PE or PE/EVOH/PE. The multi-layer material may have multiple layers of material. In some embodiments, the multi-layer material further includes a compound of botanic origin to improve resistance to insect penetration.

The liner may be held to the ceiling of the container via an attachment mechanism such as a hook and tie configuration or a permanent magnet, or via inflation by force of an air blower or by inflatable stiffening ribs coupled to the liner. The fastener may be a clamp, or a pre-attached hermetic zipper, or may be a sealing tape which is flat and completely sealed along edges of said liner. A protective mat may be placed on the bottom portion of the liner.

There is provided, in accordance with additional embodiments of the present invention, a method of shipping a commodity while retaining hermeticity. The method includes providing a shipping container, placing a thin, lightweight liner comprising a multi-layer material having a thickness in a range of 0.08-0.2 mm, having an outer layer; an inner layer; and a middle layer, wherein the middle layer includes at least one ultra-low permeability material, into the shipping container such that an open end of the liner is adjacent to a front end of the shipping container, causing a top portion of the liner to be held to a ceiling of the shipping container, introducing an agricultural commodity through the front end of the shipping container and the open end of the liner, filling the liner with the introduced commodity, and hermetically sealing the open end of the liner.

The method may be used for bagged commodities, and may include placing a mat on a floor of the liner prior to introducing the commodity via a forklift or manually. The method may also be used for bulk commodities, wherein the filling may be done using a blower or a pneumatic grain conveyer. In some embodiments, the method may further include performing gas hermetic fumigation (G-HF) on the commodity after hermetic sealing of the liner. After sealing, the method further includes closing the door of the container and shipping the commodity.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The above and further advantages of the present invention may be better understood by referring to the following description in conjunction with the accompanying drawings in which.

Figure 1:
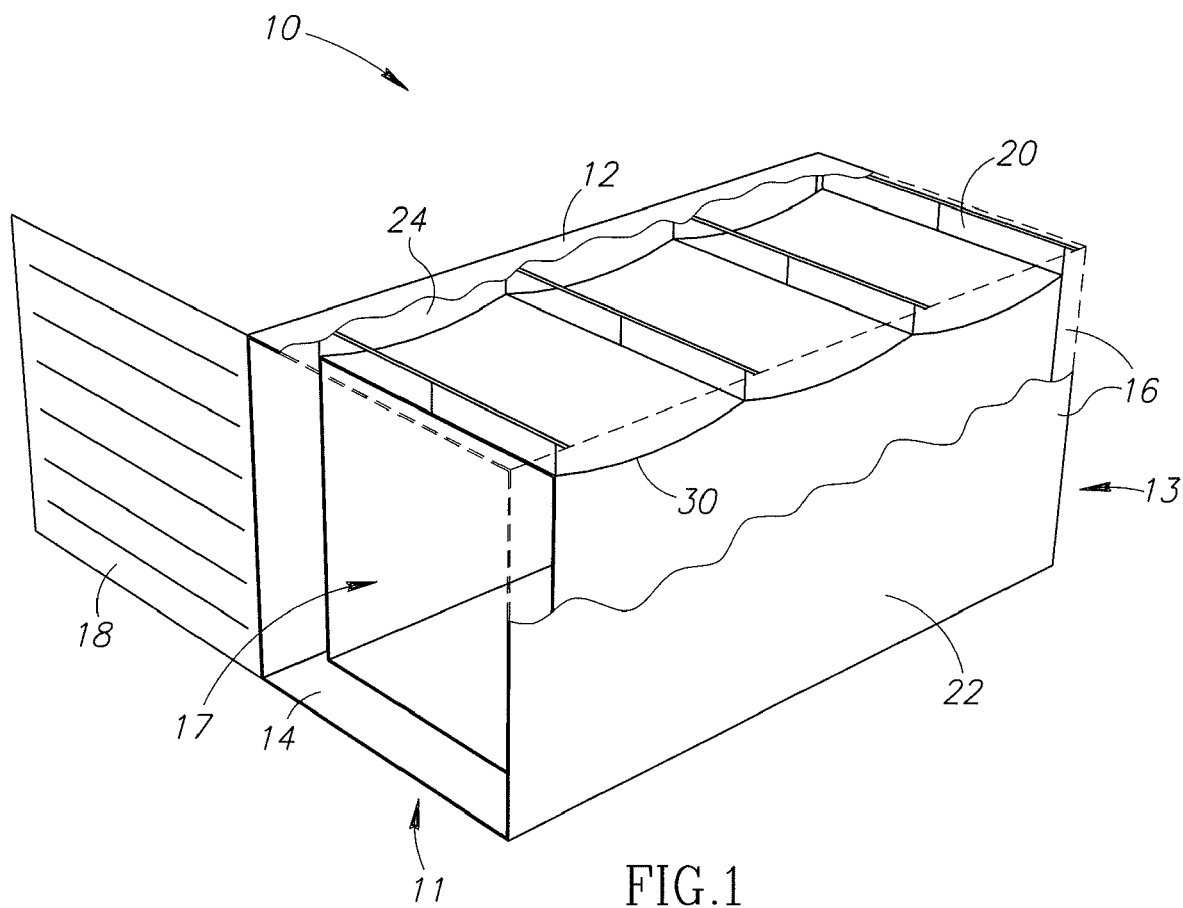
FIG. 1 is a partially cut-away perspective illustration of a shipping container with a liner attached thereto, in accordance with embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the present invention. It will be understood by those of ordinary skill in the art that the present invention may be practiced without these specific details. In other instances, well-known methods, procedures, components and structures may not have been described in detail so as not to obscure the present invention.

Embodiments of the present invention are directed to systems and methods for transportation of agricultural commodities, and more particularly to hermetic storage of a bulk or bagged agricultural commodity in a conventional shipping container using an expandable liner to protect the commodity during shipping. The systems and methods of the present invention are designed to preserve quality and prevent moisture damage of commodities stored in bulk or bagged form due to increases in moisture content or condensation that may occur during shipping in containers. The principles and operation of systems and methods according to the present invention may be better understood with reference to the drawings and accompanying descriptions.

Before explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Bulk Commodities

Bulk storage of dry or semi-dry agricultural commodities inside a shipping container, such as a standard 20- or 40-foot container, is currently done non-hermetically. Non-hermetic storage, however, fails to protect the commodity during transport against the effects of molds, insects, moisture and oxidation. Embodiments of the present invention protect the commodity by providing a hermetic liner for bulk storage of dry agricultural commodities inside shipping containers.

Reference is now made to FIG. 1, which is a partially cut-away perspective illustration of a shipping container 10 with a lightweight flexible liner 30 attached thereto, in accordance with embodiments of the present invention. For purposes of the present invention, "flexible" is defined as a membrane-like material which can be attached to the ceiling and subsequently dropped onto the commodity, and which is light enough be inflated with a blower. Container 10 includes a front end 11, a back end 13, a ceiling 12, a floor 14, walls 16 connecting ceiling 12 to floor 14, an opening 17 at said front end 11 for loading and removal of agricultural commodities, and a door 18 for closing opening 17 prior to shipping. In some embodiments, walls 16 include three walls—a first wall 20 at back end 13, and second and third walls 22 and 24 opposite each other and connecting first wall 20 to door 18. Liner 30 is held to ceiling 12 by an attachment mechanism or by inflation, as will be described in further detail herein below.

Figure 2:
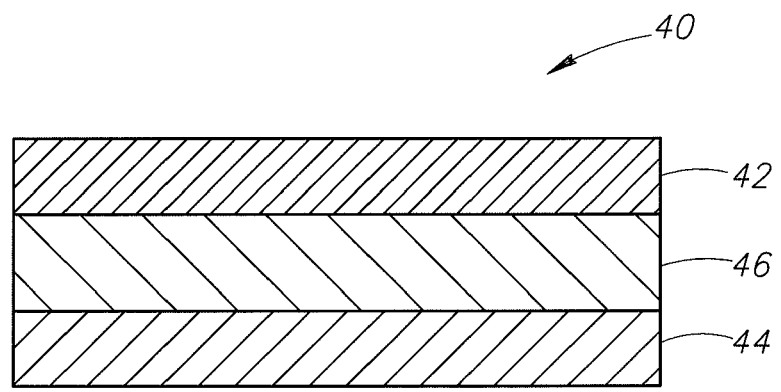
FIG. 2 is a cross-sectional illustration of a material for use as the liner of FIG. 1, in accordance with embodiments of the present invention.

Liner 30 is a thin, lightweight liner formed from a co-extruded multi-layer material having a thickness in a range of 0.08-0.2 mm with a weight of 75 to 187 gm/m2. Reference is now made to FIG. 2, which is a cross-sectional illustration of a material 40 for use as liner 30 in accordance with one embodiment of the present invention. Material 40 includes an outer layer 42 and an inner layer 44, with a middle layer 46 sandwiched between outer and inner layers 42 and 44. In accordance with embodiments of the present invention, outer layer 42 and inner layer 44 are co-extruded with middle layer 46. The purpose of middle layer 46 is to provide low permeability, while the outer and inner layers 42 and 44 are designed to add strength to and to protect middle layer 46. Middle layer 46 may include one or more ultra-low permeability layers, and may include multiple low permeability materials.

In some embodiments, any one or several of outer layer 42, inner layer 44 and middle layer 46 may include multiple layers of material. In one embodiment, middle layer 46 is nylon (PA). In another embodiment, middle layer 46 is EVOH. In yet another embodiment, middle layer 46 is comprised of a combination of two or more materials. For example, a material that has exceptionally low permeability to oxygen, but not to moisture may be combined with a material that has low permeability to water but not as low permeability to oxygen. It should be readily apparent to one of ordinary skill in the art that middle layer 46 may be comprised of any low permeability barrier material or combination of materials suitable for sandwiching between an outer layer and an inner layer. Examples include PE/Nylon/PE, or PE/EVOH/PE coextruded materials. Alternatively, outer and inner layers 42 and 44 can be comprised of any other plastic film compatible with being co-extruded with low permeability middle layer 46 and having permeabilities to oxygen between 3 and 55 cc/m2/day, for example.

In one embodiment, material 40 may additionally include a coating or impregnation of a compound of botanical origin to improve resistance to insect penetration. An example of a natural pesticide suitable for impregnation or coating is an essential oil such as produced by Biopack, Ltd. (Caesaria, Israel) and described more fully in U.S. Patent Publication US2005-0208157, filed 5 Apr. 2004, U.S. Ser. No. 10/816,861 and Israel Patent Application Number 160950, both of which are incorporated herein by reference in their entireties. This insect repellent material is intended to further prevent possible insect penetration of the liner. Methods for impregnating plastic films with essential oils are known in the art, and are described in, for example, U.S. Patent Publication Number US-2005-0208157-A1. Specifically, a composition of matter suitable for fabricating polymer-based packaging materials can be generated by mixing ar-trumerone sesquiterpene alcohols and/or turmeric oleoresin solid residue with polymers as a melt, by solvent compounding, or by immobilization or covalently linking of these compounds to the polymers.

Prior to placement in container 10, liner 30 is pre-sealed at one end and open at the other end. Liner 30 is then placed in container 10 with the pre-sealed end approximately lined up with back wall 20 and the open end approximately lined up with opening 17. Liner 30 is held to ceiling 12, as will be described in further detail herein below.

Figure 3A:
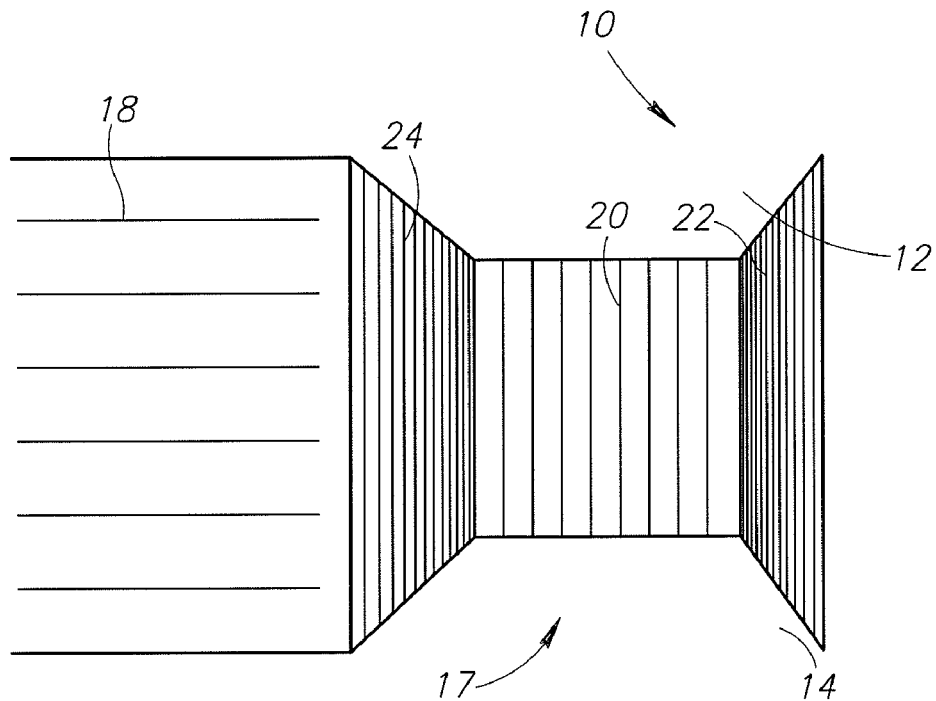
FIGS. 3A-3H are schematic illustrations of steps of a method of placing the liner of FIG. 1 in a container and loading a commodity therein, in accordance with embodiments of the present invention.
Figure 3B:
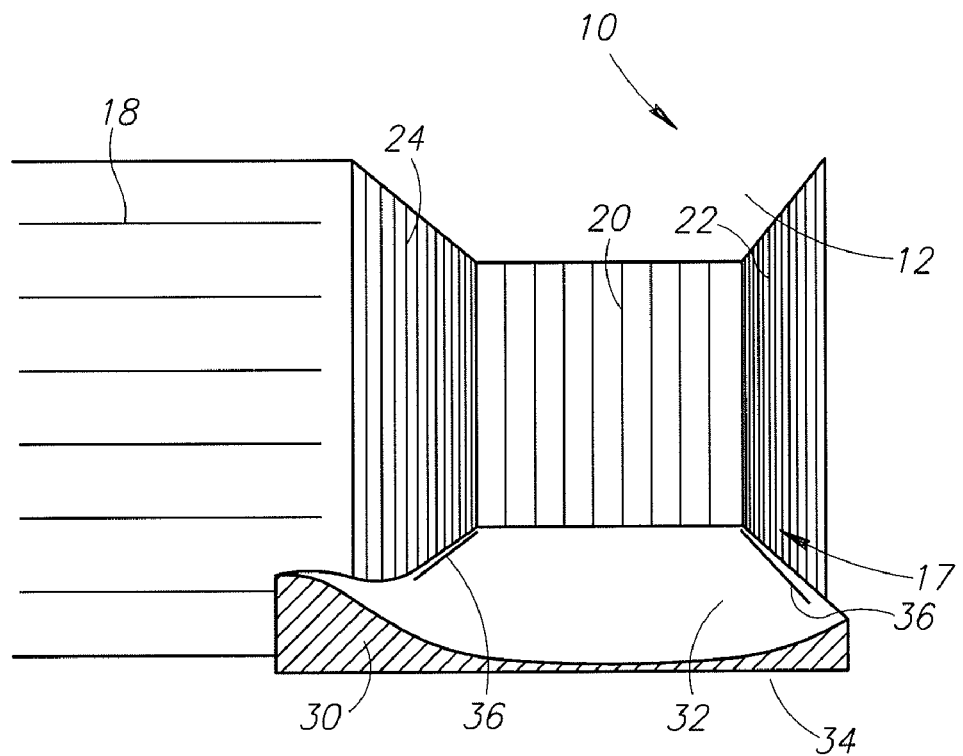
Figure 3C:
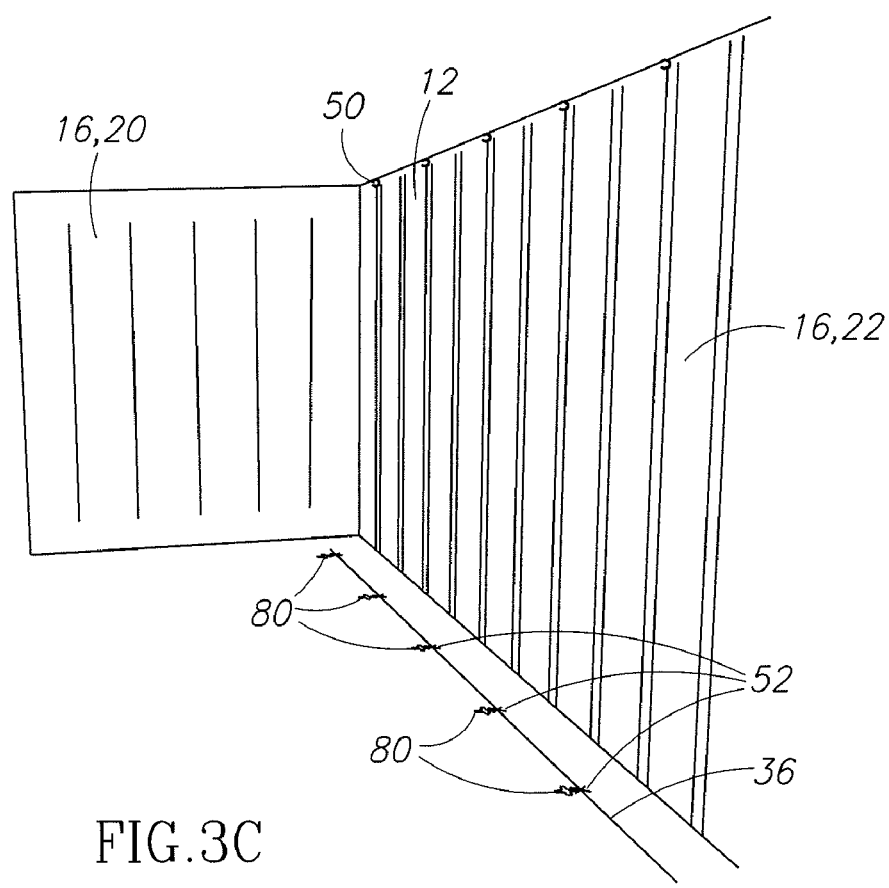
Figure 3D:
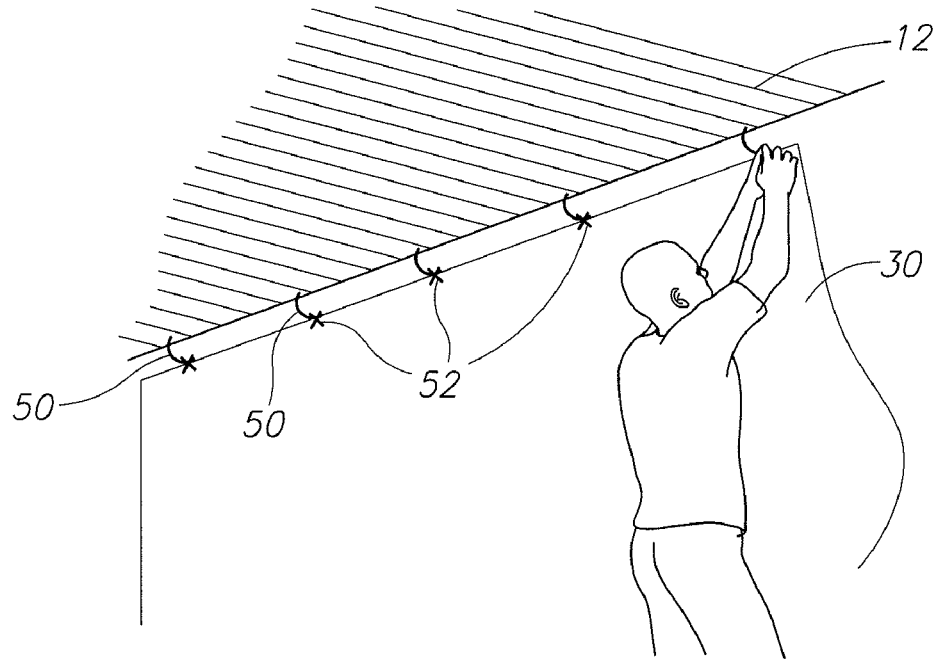
Figure 3E:
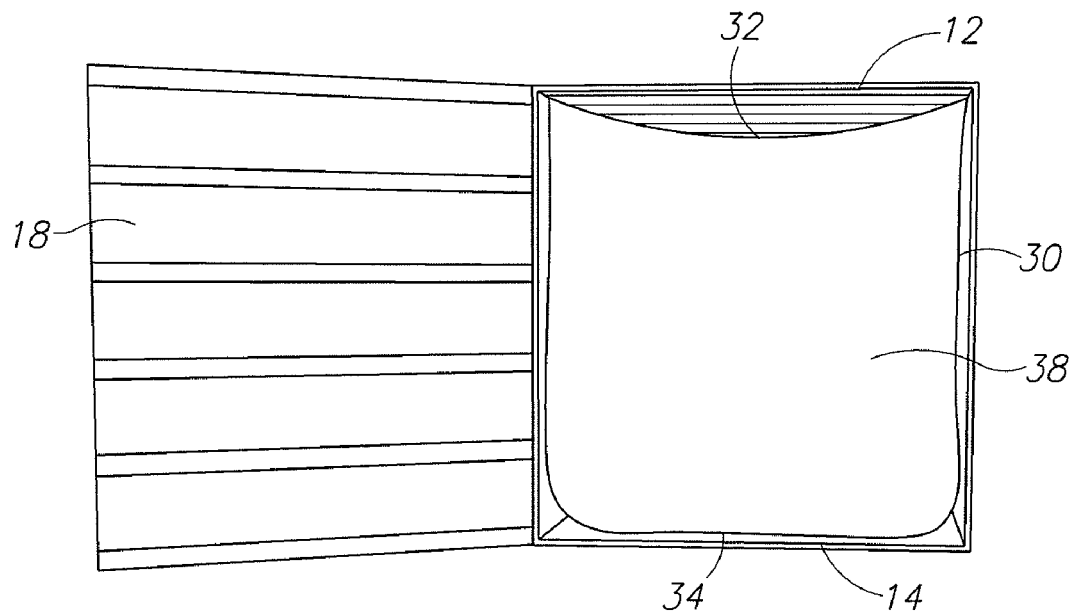
Figure 3F:
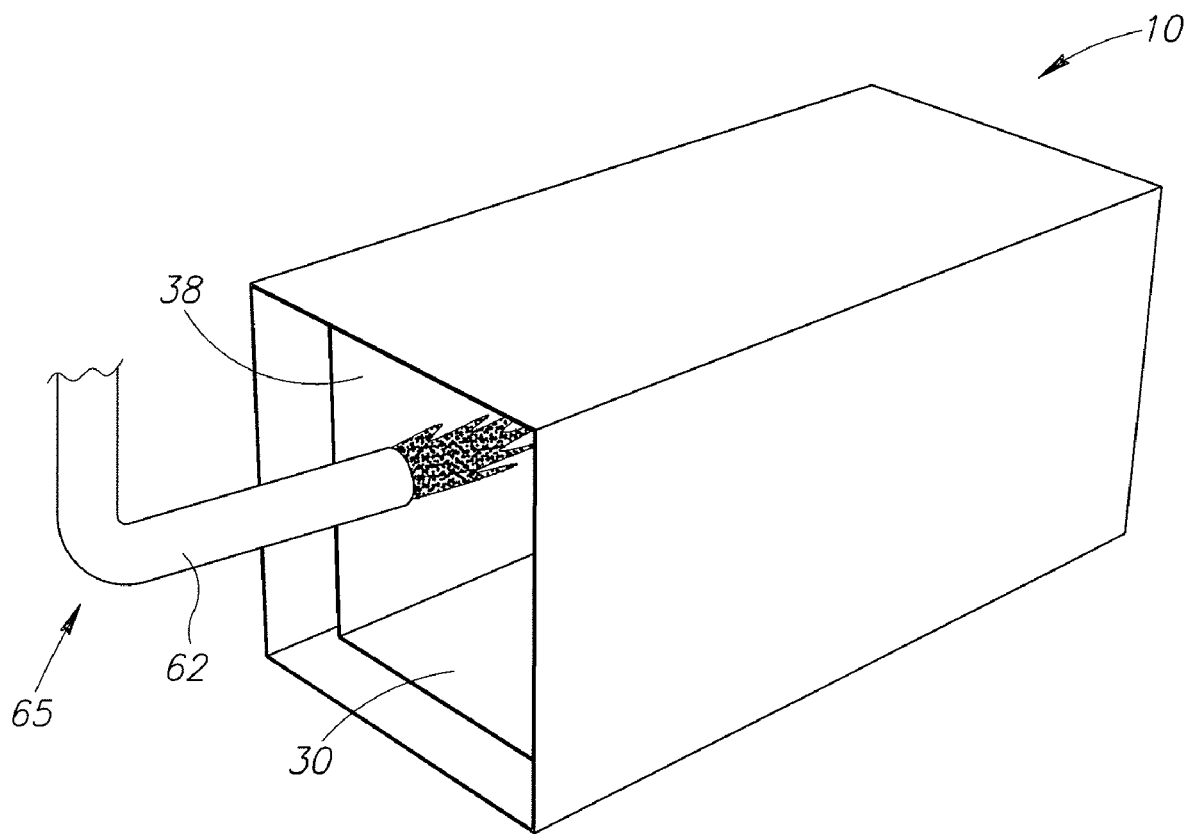
Figure 3G:
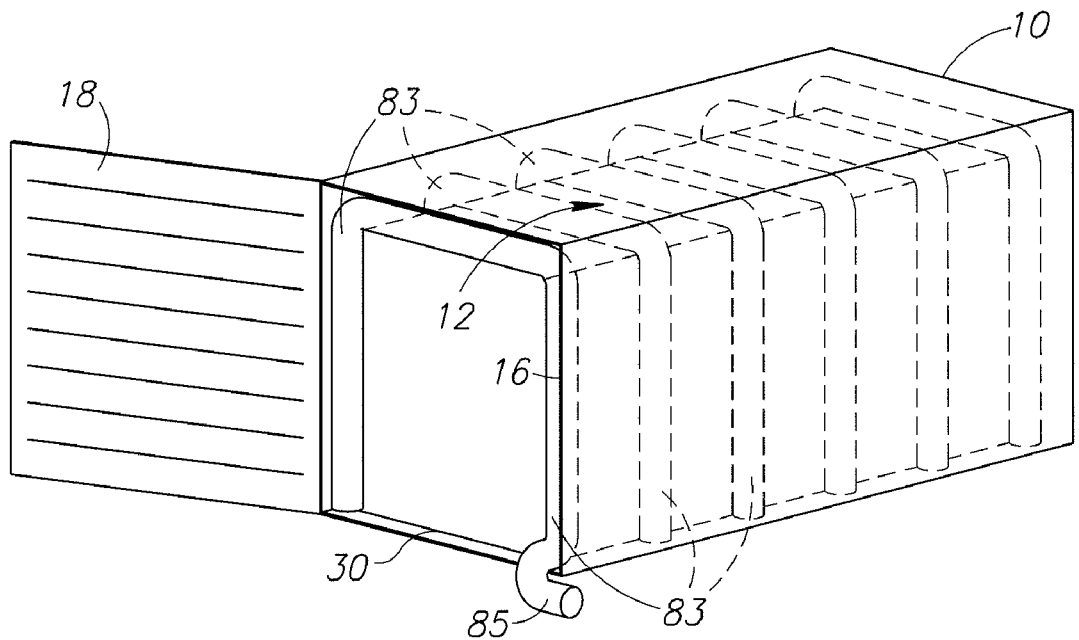
Figure 3H:
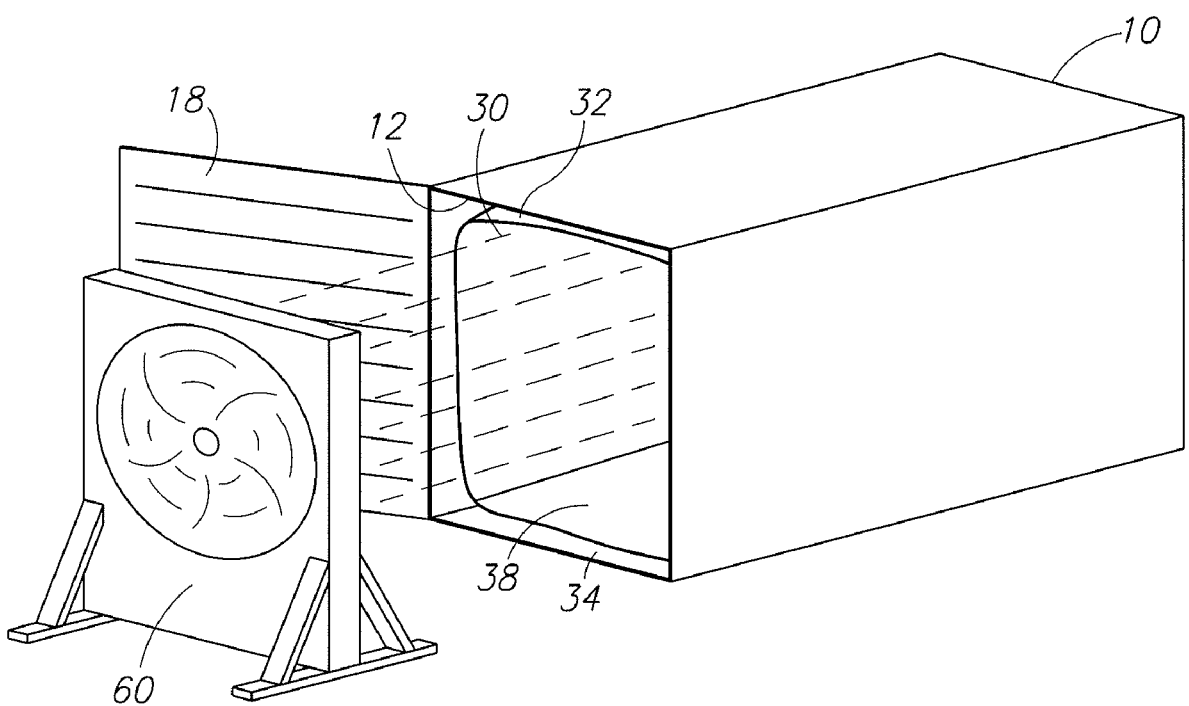
Figure 4:
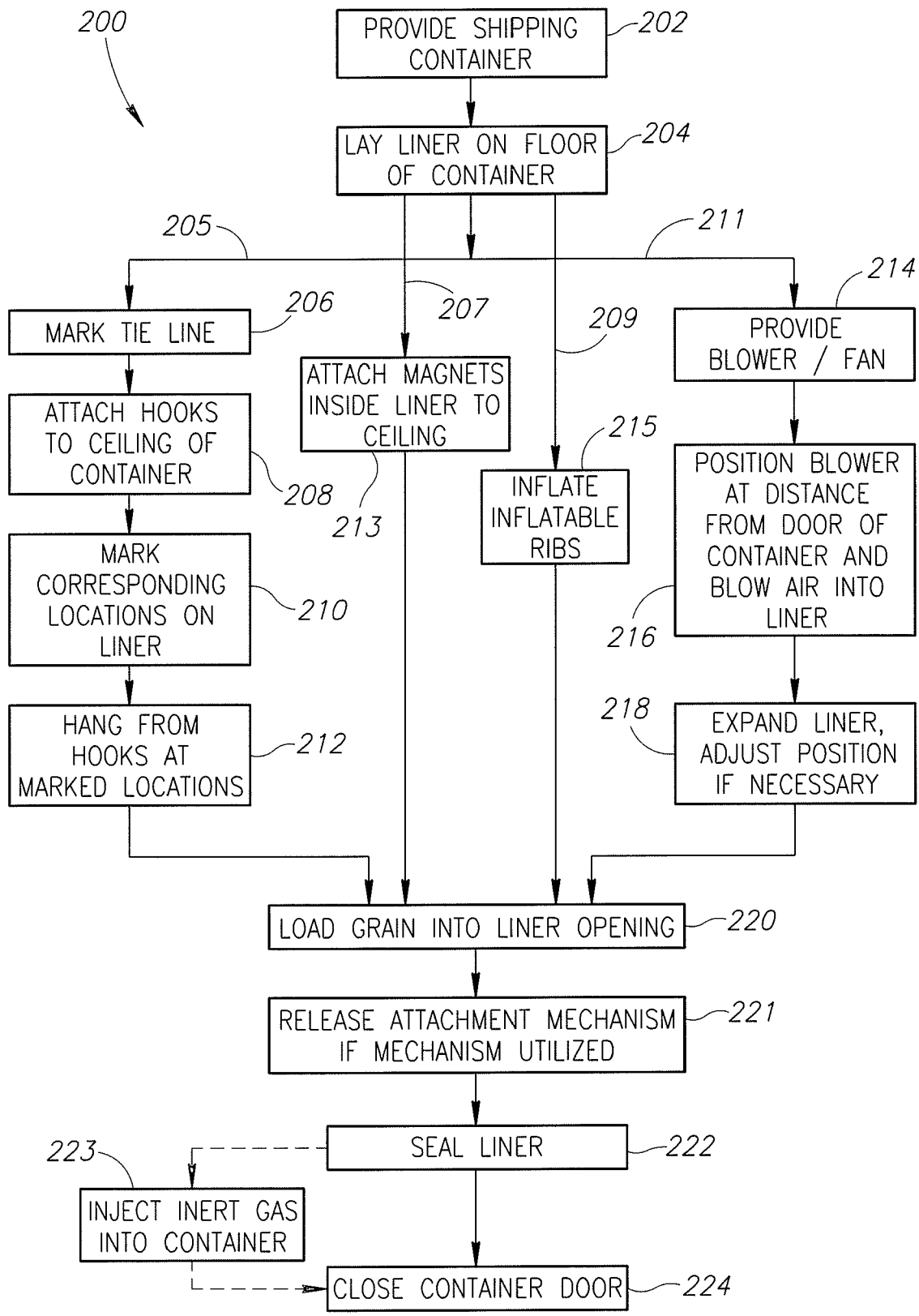
FIG. 4 is a flow-chart illustration of the method of FIGS. 3A-3H.

Reference is now made to FIGS. 3A-3H and to FIG. 4, which are schematic illustrations and a flow-chart diagram, respectively, of steps of a method 200 of placing liner 30 in container 10 and loading an agricultural commodity therein, in accordance with embodiments of the present invention. First, a container 10 such as the one depicted in FIG. 1 is provided (step 202). The inside portion of container 10 is shown in FIG. 3A. As shown, container 10 includes a floor 14, a ceiling 12, a back wall 20, two side walls 22 and 24, an opening 17 and a door 18. It should be readily apparent that although the structure of a standard or conventional shipping container is shown herein, the invention is not limited to standard sizes and shapes, and liner 30 may be similarly used in other types or shapes of shipping containers as well.

Next, as shown in FIG. 3B, liner 30 is laid (step 204) inside container 10 on top of floor 14. Liner 30 includes a top portion 32 and a bottom portion 34, which are connected to each other at the pre-sealed end positioned at back wall 20, and which are unconnected at the open end positioned at opening 17. Top portion 32 and bottom portion 34 are configured such that once liner 30 is in position, top portion 32 will be held to ceiling 12 and bottom portion 34 will remain on floor 14. Liner 30 is initially placed on floor 14 of container 10 with top portion 32 facing upwards, as shown in FIG. 3B. Liner 30 can then be opened such that top portion 32 is held to ceiling 12 while bottom portion 34 remains on floor 14. This configuration results in an opening in liner 30 through which an agricultural commodity may be introduced. Opening of liner 30 and holding of liner 30 to the ceiling of container 10 may be accomplished in several ways. In one embodiment, opening of liner 30 may be done via an attachment mechanism, such as hooks and ties (arrow 205 in FIG. 4), fabric hook and loop fasteners such as VELCRO™, magnets (arrow 207 in FIG. 4) or other attachment means. In another embodiment, opening of liner 30 may be accomplished via inflatable stiffening ribs (arrow 209 in FIG. 4). In yet another embodiment, opening of liner 30 may be accomplished via a blower or fan (arrow 211 in FIG. 4).

For the hook and tie embodiment, liner 30 is marked (step 206) with a tie line 36 to indicate which portion of liner 30 will be lifted and held to ceiling 14, as shown in FIG. 3B. Tie line 36 may stretch along the perimeter of the walls of container 10. Next, as shown in FIG. 3C, hooks 50 are attached (step 208) to ceiling 12 at the juncture between ceiling 12 and walls 16. Attachment of hooks 50 may be done earlier in the process as well. In some embodiments, container 10 may be provided with hooks 50 already positioned therein. The positions of hooks 50 are then located and marked (step 210) at corresponding locations 52 along tie line 36.

Figure 5A:
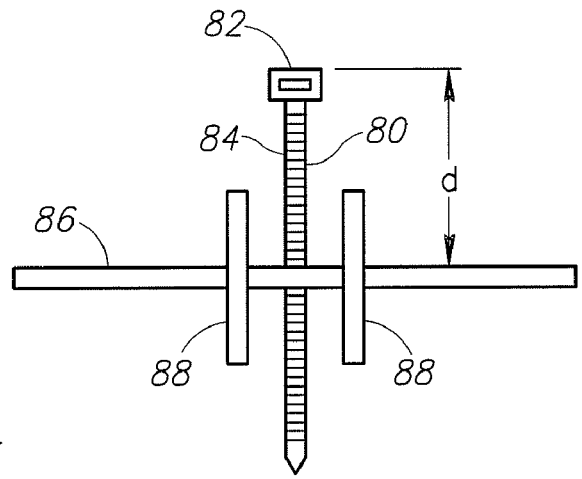
FIG. 5A is an illustration of a tie configuration, which may be used in embodiments of the present invention to hold the liner of FIG. 1 to a ceiling of the container.

Reference is now made to FIG. 5A, which is an illustration of a tie configuration, which may be used in embodiments of the present invention. The tie configuration may be assembled as follows. A cable tie 80 is provided, having a head 82 and a stem 84. A piece of adhesive 86, which may be tape, for example, is placed crosswise from stem 84, at a distance d from head 82. In some embodiments distance d is approximately three inches. In other embodiments, distance d may be any suitable distance such as between 2 and 10 inches. Cable tie 80 is positioned on liner 30 on tie line 36 at each of locations 52, as shown in FIG. 3C. Adhesive 86, which may be tape, for example, is placed over each cable tie 80 to attach each cable tie 80 to liner 30. In each case, two pieces of reinforcement tape 88 may be attached parallel to stem 84 to provide sufficient strength to support the weight of liner 30, which may be, for example, 2 kg or less per hook.

Figure 6:
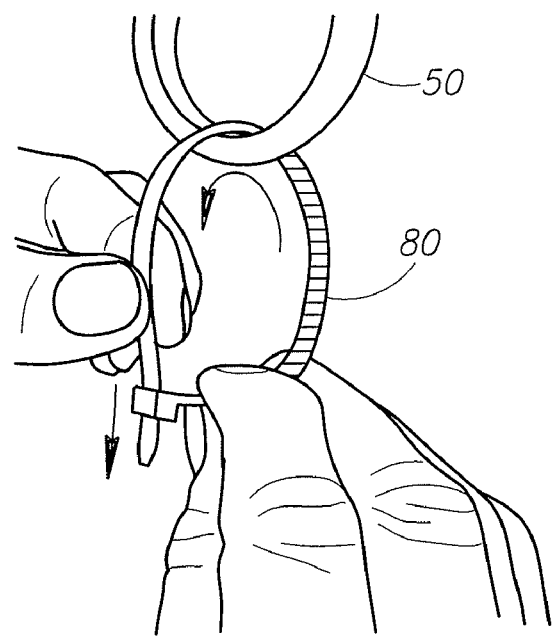
FIG. 6 is an illustration of the tie configuration of FIG. 5A, being placed through a hook in accordance with embodiments of the present invention.

Returning now to FIGS. 3A-3G and FIG. 4, next, as shown in FIG. 3D, marked locations 52 of liner 30 are hung (step 212) from corresponding hooks 50. This is done on a first side of container 10, followed by a second side of container 10, and additionally on the back wall 20. Liner 30 should be fastened to every available hook 50. In some embodiments, a hook 50 is also provided at opening 17 near door 18. As shown in FIG. 6, the pointed end of cable tie 80 is positioned through hook 50 in an upward motion. The loose end of cable tie 80 is inserted through head 84 in a downward motion. The tie is closed in a manner that allows liner 30 to swing. The fully hung liner 30 is shown in FIG. 3E, wherein liner 30 has an opening 38 for receiving grain therein. Grain may be loaded (step 220) via a pneumatic grain conveyer 62, as shown in FIG. 3F. The pneumatic grain conveyer 62 may be, for example, a pneumatic commercial grain conveyer or commercial grain thrower with a capacity of 20 to 30 tons/hour, such as the Kongskilde SUC-500E, of Soro, Denmark.

It should be readily apparent that the method for holding liner 30 to ceiling 12 is not limited to the methods described above. For example, other attachment means may be used, such as clips, fabric hook and loop fasteners such as VELCRO™, or any other suitable means.

Figure 5B:
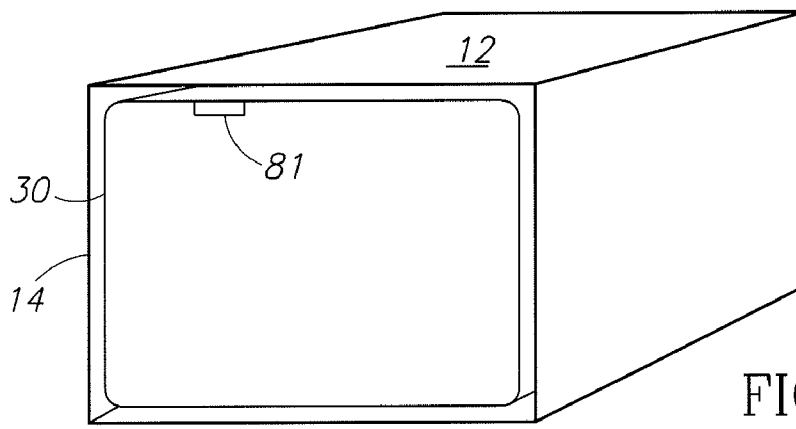
FIG. 5B is an illustration of a magnet configuration, which may be used in additional embodiments of the present invention to hold the liner of FIG. 1 to a ceiling of the container.

For example, magnets may be used to attach liner 30 directly to container 10. The use of magnets eliminates the need to take into account the location of ceiling mounted hooks 50. Reference is now made to FIG. 5B, which is an illustration of a magnet configuration, in accordance with embodiments of the present invention. As shown in FIG. 5B, a magnet 81 inside the liner is used instead of cable tie 80, wherein magnet 81 that has a holding force against steel of 2 kg or more is used. Next, magnets 81 are attached inside the liner 30 clamping the liner (step 213) to the ceiling 12 or the top of the walls 14 16 of container 10. This is done on a first side of container 10, followed by a second side of container 10, and additionally on the back wall 20. The fully hung liner 30 is shown in FIG. 3E, wherein liner 30 has an opening 38 for receiving grain therein. Grain may be loaded (step 220) via a pneumatic grain conveyer 62, as shown in FIG. 3F.

In an alternative embodiment, as shown in FIG. 3G, air inflatable ribs 83 are incorporated within or attached to liner 30. Liner 30 is opened and maintained in a open state by inflating (step 215) inflatable ribs 83 against walls 16 and ceiling 12 of container 10. Inflation or deflation of ribs 83 may be controlled via a valve 85 which, for example, may be similar to a valve used on an automobile. Grain may be loaded (step 220) via a pneumatic grain conveyer 62, as shown in FIG. 3F.

In an alternative embodiment, as shown in FIG. 3H, a blower/fan 60 is provided (step 214) and positioned (step 216) at a distance from door 18 of container 10. Liner 30 is expanded or blown open (step 218) via airflow from blower/fan 60 so as to form opening 38. The distance between blower/fan 60 and door 18 may be any suitable distance, such as, for example, up to 5 meters to allow ease of loading. While liner 30 is being expanded, liner 30 may be further adjusted into position (step 218) by carefully pushing upwards on top portion 32 of liner 30 towards ceiling 12 of container 10. In this embodiment, filling of container 10 with loose grain (step 220) may be done while liner 30 is being expanded, either via the same pneumatic grain conveyer 62 used for loading the grain 30, or via a separate blower.

Filling of Container

As shown in FIG. 3F, filling can be accomplished using any type of filling tube 65, such as pneumatic grain conveyer 62. Initially, filling tube 65 is positioned such that a back portion (i.e., near the pre-sealed end) of liner is filled first, and the remainder of liner 30 is filled from back to front. As liner 30 is filled with grain, and a wedge of commodity is thus created, filling tube 65 may be gradually withdrawn. In some embodiments, filling tube 65 is located near the top of liner 30. In some embodiments, filling tube 65 may be integrated with liner 30 as a sleeve, or supported by hanging from the top of liner 30 by means of loops and gradually withdrawn, or may be a long rigid tube extending from an external mount into the liner and gradually pulled back. As the section close to the door is filled with grain, and before the slope of the grain on the floor reaches the door, a supporting element may be placed at the opening to prevent grain spilling out of the container due to grain pressure. For example, a temporary support located at the opening may be used and gradually raised to permit blower 62 or blower/fan 60 to complete the filling by providing a support to the open end of the liner. Alternatively, door 18 may have a fill hole, allowing liner 30 to be filled while the fill hole of door 18 is open. In yet another embodiment, a tarpaulin flap with one or more apertures for the loading pneumatic grain conveyer 62 or the blower may be temporarily tied to the opening of container 10 during loading.

Liner 30 may be loaded by section, starting at back wall 20. As each section is filled, the tie assembly or magnets, if used, may be detached from the container for that particular section. This step-wise detachment ensures that a minimum amount of air space is left above liner 30 after sealing, thereby providing a small air gap above the liner to minimize heating of the top of the liner. This minimization reduces top surface condensation which may occur due to temperature differences between agricultural commodities near the top of the liner versus those near the bottom of the liner and resulting convection currents. Detaching may be done by pulling on liner 30 until adhesive 86 comes off, or by removing magnets 81, for example, releasing the liner from contact with the ceiling of the shipping container. This may be accomplished with minimal force, typically 1000 to 3000 grams of force per tie or magnet. Generally, the force needed to remove or release adhesive 86 or magnets 81 is at least two to four times the weight of the section of liner being held up.

Figure 7A:
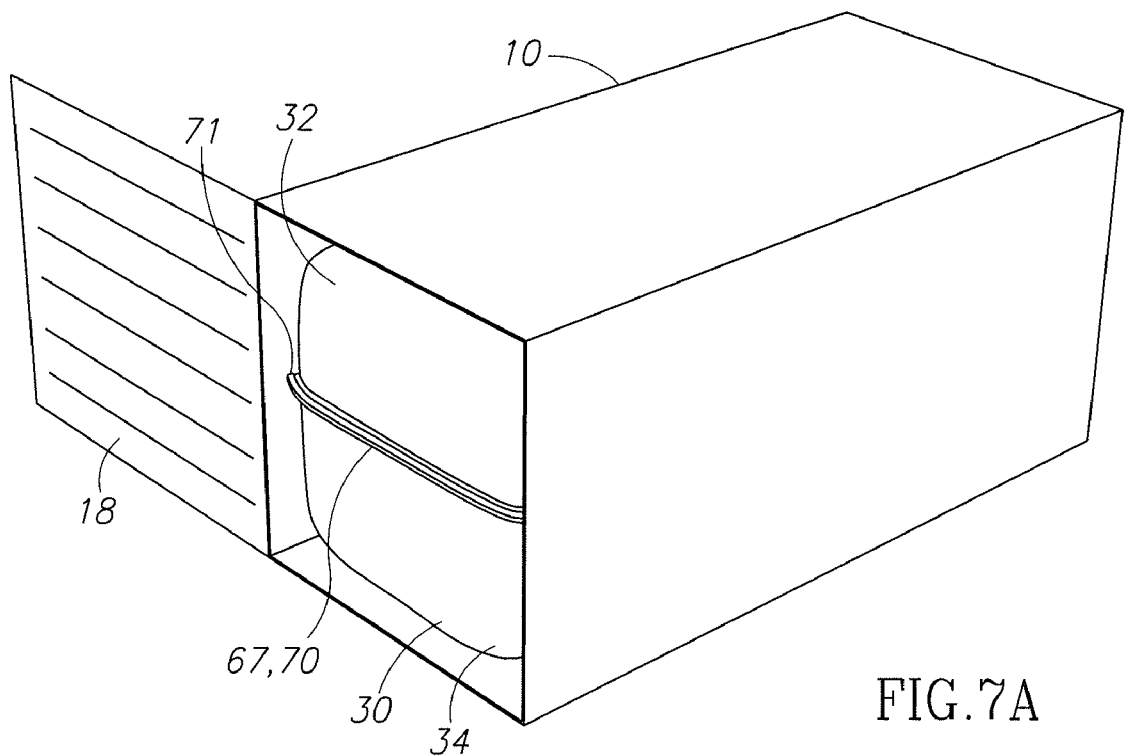
FIGS. 7A-7E are illustrations of a liner being sealed with a fastener.
Figure 7B:
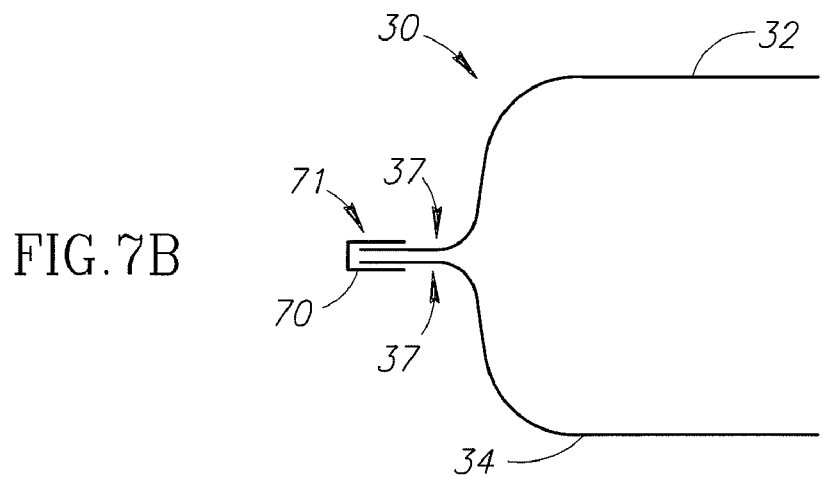

Referring now to FIGS. 7A-7D and returning to FIG. 4, after liner 30 is full, its end may be sealed (step 222) using a fastener 67. In one embodiment, fastener 67 is a sealing tape 70, as shown in FIGS. 7A-7D. Reference is now made to FIG. 7A, which is an illustration of liner 30 sealed with sealing tape 70. Top portion 32 and bottom portion 34 are brought into contact, and sealed with sealing tape 70, forming a lip 71. Reference is now made to FIG. 7B, which is a side view of liner 30 showing ends 37 of liner 30, sealed with sealing tape 70. End 37 of top portion 32 is positioned over end 37 of bottom portion 34. Sealing tape 70 is then placed around ends 37 to seal top portion 32 to bottom portion 34, thus forming a hermetic lip 71.

Figure 7C:
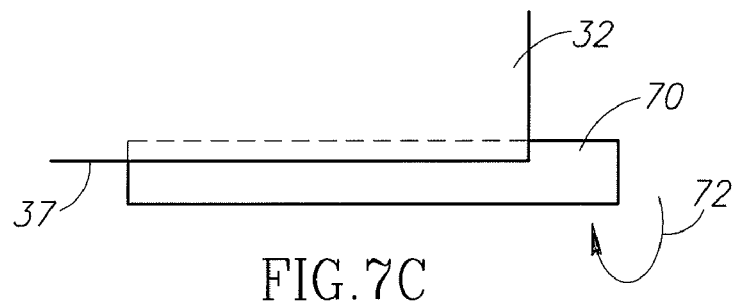
Figure 7D:
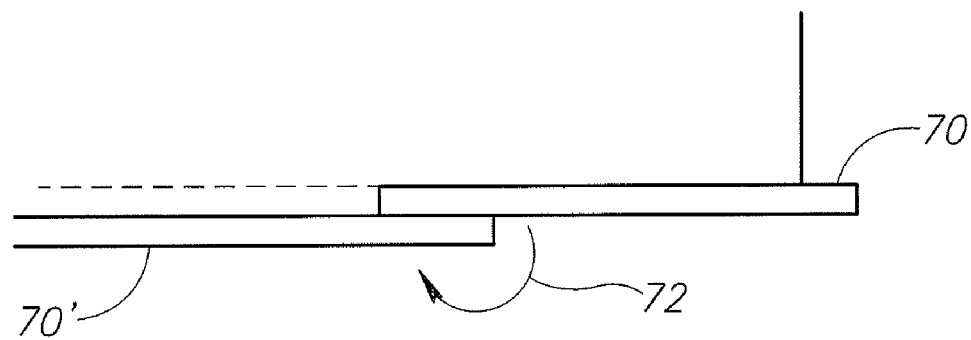
Figure 7E:
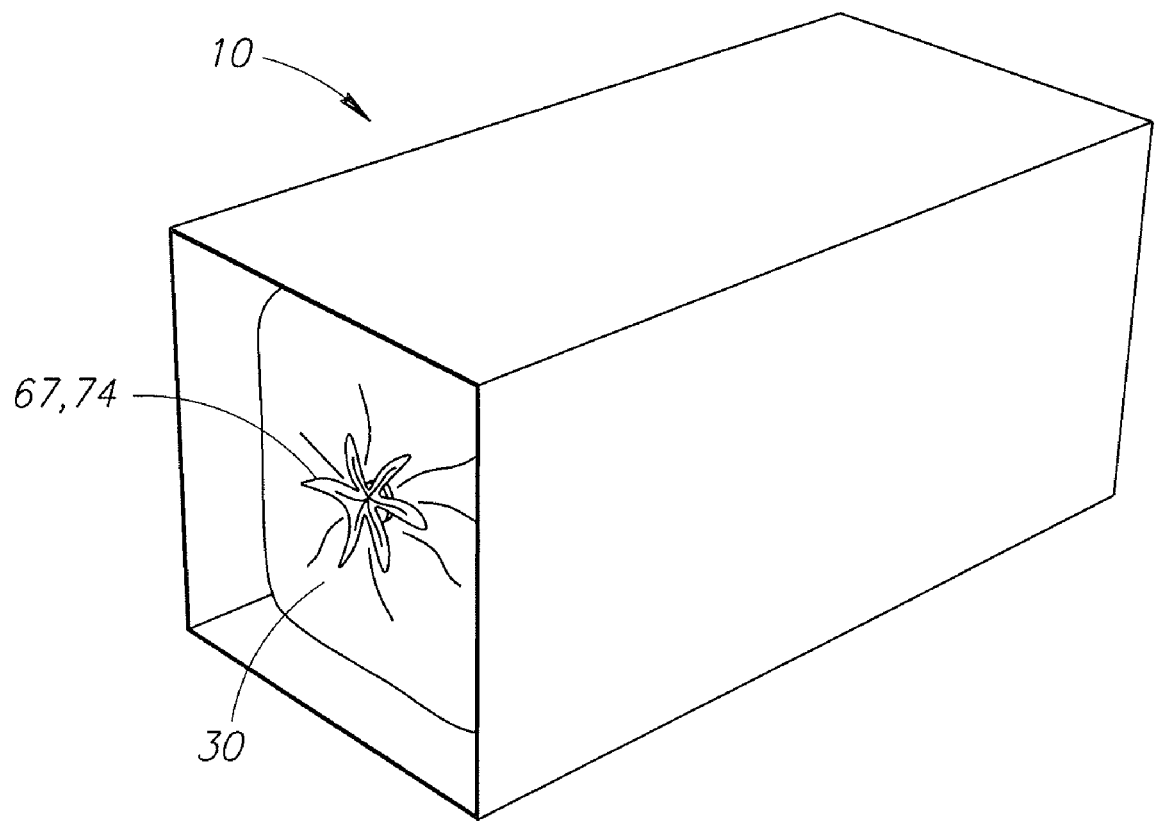

Reference is now made to FIGS. 7C and 7D, which are top-view schematic illustrations showing the process of taping ends 37 with sealing tape 70. As shown in FIG. 7C, ends 37 of top portion 32 and bottom portion 34 of liner 30 are positioned on top of one another. Since FIG. 7C is a top view, only top portion 32 is visible. Sealing tape 70 is attached to one side of ends 37—shown in FIG. 7C as attached to bottom portion 34, wherein a portion of sealing tape 70 is left unsealed and hanging over ends 37, and may be subsequently folded over in a direction shown by arrow 72 in order to seal ends 37 together. In some embodiments, an additional length of sealing tape 70 is positioned past the area of overlap of top portion 32 and bottom portion 34 to ensure airtight sealing at the egress. The amount of overlap may be one-half inch or more to insure air tightness. As shown in FIG. 7D, subsequent pieces of sealing tape 70 are positioned similarly, with an overlap between the first piece of sealing tape 70 and the second piece of sealing tape 70' and so on. The first piece of sealing tape 70 is shown in FIG. 7D after folding, and the second piece of sealing tape 70' is shown in FIG. 7D prior to folding, and will be folded in the direction of arrow 72, just as the first piece of sealing tape 70. This procedure is continued until liner 30 is completely sealed. The amount of overlap between subsequently placed pieces of sealing tape 70 may vary, and to ensure air tightness, may be in a range of one-half inch or more, for example. It is important to ensure that the tape is flat and sealed along edges 37, and it is important to avoid wrinkles in liner 30 under the tape, so as to avoid leaving micro-air passages. In an alternative embodiment, as shown in FIG. 7E, fastener 67 is a clamp 74. In yet another embodiment, fastener 67 may comprise an airtight plastic zipper, similar to zippers used in zipper bags such as ZIPLOC™, which may be pre-welded to the liner and used as a means of sealing.

When necessary, the liner may be patched in case of puncture, by applying tape to the top of the puncture or tear. The tape must be flat and wrinkles in the liner must be avoided in order to maintain hermeticity.

Figure 8:
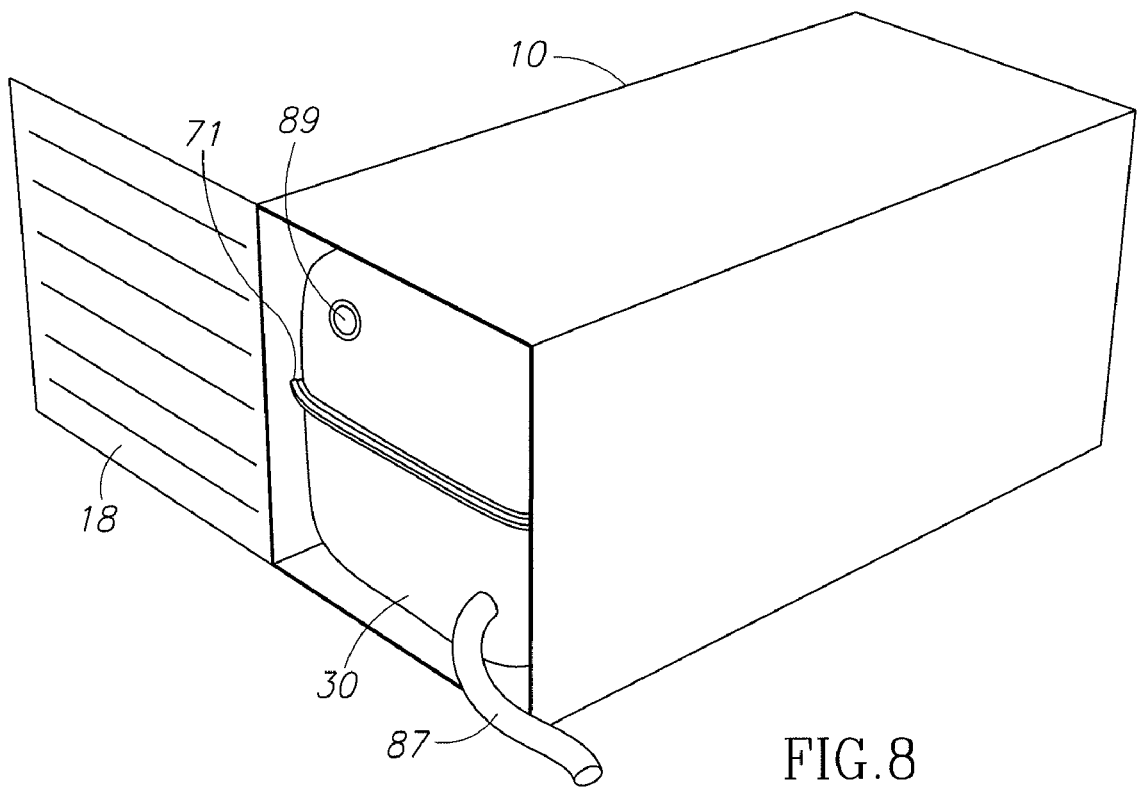
FIG. 8 is an illustration of a container and a liner configured for gas hermetic fumigation.

Reference is now made to FIG. 8, which is an illustration of a liner 30 in accordance with embodiments of the present invention, suitable for use with gas hermetic fumigation. At its sealed end (i.e., the front end which is sealed after loading has been completed), liner 30 further comprises a gas inlet valve 87 and a gas outlet valve 89. Once liner 30 is sealed, an inert gas such as CO2 is injected (step 223) into liner 30 via gas inlet valve 87 and air is removed via gas outlet valve 89. Gas inlet valve 87 is positioned towards a bottom portion of liner 30, and gas outlet valve is positioned towards a top portion of liner 30, since CO2 is heavier than air. The inserted CO2 will kill all living insects, larvae and eggs within a certain exposure time (typically 3 to 14 days, depending on the temperature, type of commodity and insect species). This step is optional, and may be performed when gas hermetic fumigation is desired.

Once liner 30 has been sealed, and optionally the gas hermetic fumigation has taken place, door 18 of container 10 is closed (step 224).

Unloading of Container

Once container 10 arrives at its destination, door 18 may be opened, and liner 30 unsealed. In one embodiment for bulk shipments, liner 30 is connected to an unloading tube to which a vacuum is connected, such as those found on pneumatic grain conveyers. For example, the filling tube may become an air inlet to avoid creating a vacuum in liner 30 when unloading. Alternatively, liner 30 may be manually unloaded. Liner 30 may be disposable or may be reusable.

Bagged Agricultural Commodities

Storage of bagged agricultural commodities inside a shipping container, such as a standard 20- or 40-foot container, is currently done non-hermetically. Non-hermetic storage, however, fails to protect the bagged commodity against the effects of insects, molds, moisture or oxidation during transport. Embodiments of the present invention provide a hermetic liner for storage of bagged dry agricultural commodities inside standard or non-standard shipping containers.

The steps leading up to loading of the bagged agricultural commodities are similar to those as described above with reference to bulk agricultural commodities. It is noted, however, that step 220 would be the loading of bagged commodities as described below. Thus, a liner 30, such as the one described above, is provided and held to ceiling 12 of container 10—either by hooks or some other attachment means, or by inflating via inflatable ribs or a blower or blower/fan.

Figure 9:
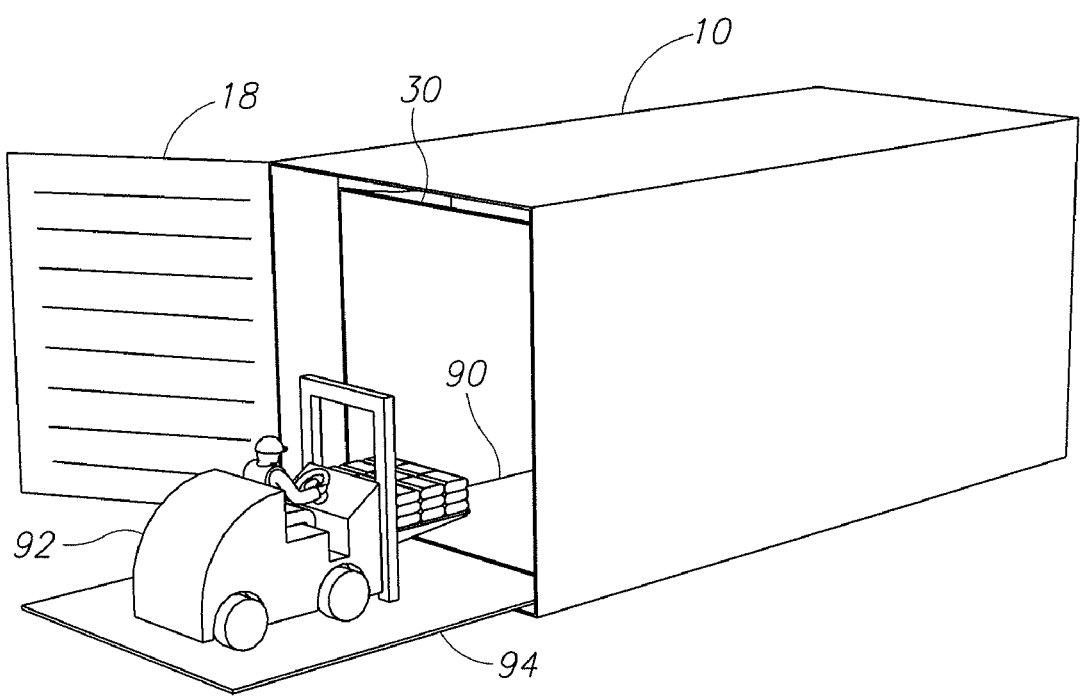
FIG. 9 is schematic illustration of a container with a liner in place, wherein the container is being loaded with bagged commodities using mechanical means, in accordance with an embodiment of the present invention.

Reference is now made to FIG. 9, which is a schematic illustration of container 10 with liner 30 in place, wherein container 10 is being loaded with bagged commodities, in accordance with embodiments of the present invention. Once liner 30 is in place, as described with reference to FIG. 4, a protective mat 90 is placed on bottom portion 34 of liner 30 to prevent loading damage. Loading is then either done manually one bag at a time or done using a forklift 92 as shown in FIG. 9. Forklift 92 may be driven over a separate loading mat 94, or over a loading ramp or sheet of corrugated metal. Alternatively, protective mat 90 may extend out of container 10, and forklift 92 may be driven over the extended portion of protective mat 90. Protective mat 90 can be progressively removed as loading proceeds gradually by pulling out the mat immediately before lowering pallets or bags starting at the front of the liner, or protective mat 90 can be left in place. If hooks or magnets are used to hold liner to ceiling, they may be progressively removed to create an air gap between ceiling and liner in like manner to the previous example for bulk grains. Liner 30 is then sealed as described above with reference to bulk commodities—either using sealing tape, or other sealing means such as a clamp or zipper, if desired, gas hermetic fumigation is performed, and door 18 is closed. After reaching the desired destination, door 18 may be opened, liner 30 unsealed, and the bagged agricultural commodity may be removed by forklift 92 or manually one bag at a time.

While certain features of the present invention have been illustrated and described herein, many modifications, substitutions, changes, and equivalents may occur to those of ordinary skill in the art. It is, therefore, to be understood that the appended claims are intended to cover all such modifications and changes as fall within the true spirit of the present invention.

What is claimed is:

1. A system to protect agricultural commodities during shipping of bulk or bagged commodities in shipping containers, the system comprising:
    a shipping container having a container front end and a container back end, a ceiling, a floor, walls connecting said ceiling to said floor, a container opening at said front end, and a door for closing said container opening;
    a thin, lightweight liner weighing between 75 and 187 gm/m$^2$, said liner comprising a multi-layer material having a thickness in a range of 0.08-0.2 mm, having an outer layer; an inner layer; and a middle layer, said middle layer comprising at least one ultra-low permeability material, said thin lightweight liner having a bottom portion, a top portion, a pre-sealed back end positioned at said container back end, said sealed back end sealing said bottom portion to said top portion, and an open end positioned at said container opening, wherein said top portion is configured to be held to said ceiling of said shipping container, and
    a fastener for hermetically sealing said open end of said thin, lightweight liner,
    wherein said top portion of said liner is held to said ceiling via inflation by at least one of:
        force of an air blower and inflatable stiffening ribs coupled to said liner.

2. The system of claim 1, wherein said liner has a permeability to oxygen at 25° C. of 3 to 55 cc/m$^2$/day.

3. The system of claim 1, wherein said multi-layer material is co-extruded.

4. The system of claim 1, wherein said multi-layer material is at least one of: PE/nylon/PE and PE/EVOH/PE.

5. The system of claim 1, wherein said multi-layer material further comprises a compound of botanic origin to resist insect penetration.

6. The system of claim 1, wherein said top portion of said liner is held to said ceiling via an attachment mechanism.

7. The system of claim 6, wherein said attachment mechanism comprises at least one of: a hook and tie configuration, and a permanent magnet.

8. The system of claim 1, wherein said fastener comprises at least one of: sealing tape, a clamp, and a pre-attached hermetic zipper.

9. A method of shipping a commodity while retaining hermeticity, the method comprising:
- providing a shipping container;
- placing a thin, lightweight liner comprising a multi-layer material having a thickness in a range of 0.08-0.2 mm, having an outer layer; an inner layer; and a middle layer, said middle layer comprising at least one ultra-low permeability material, into said shipping container such that an open end of said liner is adjacent to a front end of said shipping container;
- causing a top portion of said liner to be held to a ceiling of said shipping container;
- introducing an agricultural commodity through said front end of said shipping container and said open end of said liner;
- filling said liner with the introduced commodity; and
- hermetically sealing said open end of said liner,
- wherein causing a top portion of said liner to be held to the ceiling comprises at least one of: inflating said liner via a blower and inflating ribs in said liner.

10. The method of claim 9, wherein said introducing comprises introducing at least one of: bagged commodities and bulk commodities.

11. The method of claim 9, wherein at least one of said introducing and said filling comprises operating at least one of: a blower and a pneumatic grain elevator.

12. The method of claim 9, wherein said hermetically sealing comprises at least one of: taping, clamping, and operating a pre-attached hermetic zipper.

13. The method of claim 9, further comprising performing gas hermetic fumigation on the commodity.

14. A system to protect agricultural commodities during shipping of bulk or bagged commodities in shipping containers, the system comprising:
- a shipping container having a container front end and a container back end, a ceiling, a floor, walls connecting said ceiling to said floor, a container opening at said front end, and a door for closing said container opening;
- a thin, lightweight liner comprising a co-extruded multi-layer material having an outer layer; an inner layer; and a middle layer, said middle layer comprising at least one ultra-low permeability material, said thin lightweight liner having a bottom portion, a top portion, a pre-sealed back end positioned at said container back end, said sealed back end sealing said bottom portion to said top portion, and an open end positioned at said container opening, wherein said top portion is configured to be held to said ceiling of said shipping container, said liner having a permeability to oxygen at 25° C. of 3 to 55 $cc/m^2/day$; and
- a fastener for hermetically sealing said open end of said thin, lightweight liner,
- wherein said liner is configured to be openable, at said open end, via blowing of air.

* * * * *